United States Patent [19]
Yamaji

[11] Patent Number: 5,668,645
[45] Date of Patent: Sep. 16, 1997

[54] METHOD AND APPARATUS FOR PRINTING FILMS

[75] Inventor: Yoshiyuki Yamaji, Wakayama, Japan

[73] Assignee: Noritsu Koki Co., Ltd., Wakayama, Japan

[21] Appl. No.: 365,818

[22] Filed: Dec. 29, 1994

[51] Int. Cl.[6] .................................................. H04N 1/04
[52] U.S. Cl. .......................... 358/487; 358/498; 358/401; 355/38
[58] Field of Search ........................... 358/487, 498, 358/471, 496, 474, 506, 505, 401, 501; 355/38, 40, 41, 75; 414/222, 225, 744.2, 744.8; 348/96–98, 102, 105, 112; 353/26 R, 25

[56] References Cited

U.S. PATENT DOCUMENTS

| | | | |
|---|---|---|---|
| 4,576,473 | 3/1986 | Kogane et al. | 355/68 |
| 4,676,710 | 6/1987 | Shiraishi | 414/225 |
| 5,052,540 | 10/1991 | Matsuyama et al. | 414/222 |
| 5,159,385 | 10/1992 | Imamura | 355/40 |
| 5,162,842 | 11/1992 | Shiota | 355/40 |
| 5,212,512 | 5/1993 | Shiota | 354/319 |
| 5,232,505 | 8/1993 | Novak et al. | 414/222 |
| 5,253,011 | 10/1993 | Zahn et al. | 355/41 |
| 5,280,860 | 1/1994 | Kataoda | 355/75 |
| 5,313,882 | 5/1994 | Karlyn et al. | 414/788.7 |
| 5,333,033 | 7/1994 | Blackman | 355/40 |
| 5,438,389 | 8/1995 | Kito et al. | 355/38 |
| 5,461,454 | 10/1995 | DeMarti, Jr. et al. | 355/41 |
| 5,555,073 | 9/1996 | Grossman et al. | 355/38 |
| 5,556,185 | 9/1996 | Bungo et al. | 353/26 R |

FOREIGN PATENT DOCUMENTS 40 00 796  7/1990  Germany .

*Primary Examiner*—Edward L. Coles, Sr.
*Assistant Examiner*—Fan Lee
*Attorney, Agent, or Firm*—Wenderoth, Lind & Ponack

[57] ABSTRACT

A photographic printer can process a plurality of films each housed in a separate cartridge concurrently with high efficiency. The printer has a base and a rotary table rotatably mounted on the base. Four cartridge holders are mounted on the rotary table along its circumference at angular intervals of 90°. Mounted on the base around the rotary table are a cartridge supply unit, a scanner unit and a printing/exposure unit arranged opposite to three of the four cartridge holders, respectively. The scanner unit and the printing/exposure unit are provided separately from and driven independently of each other, so that the film processing steps in these units can be carried out concurrently.

11 Claims, 8 Drawing Sheets

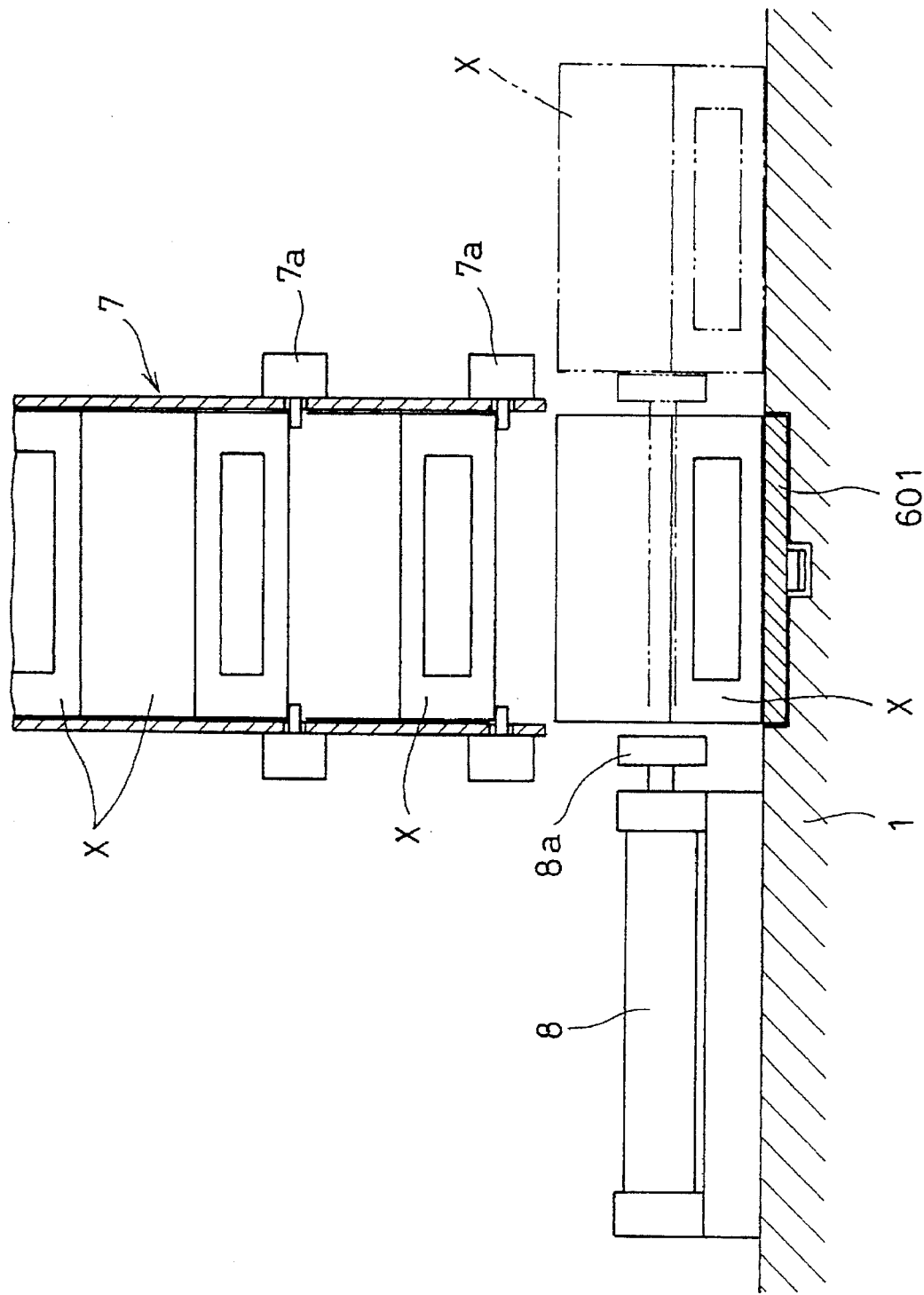

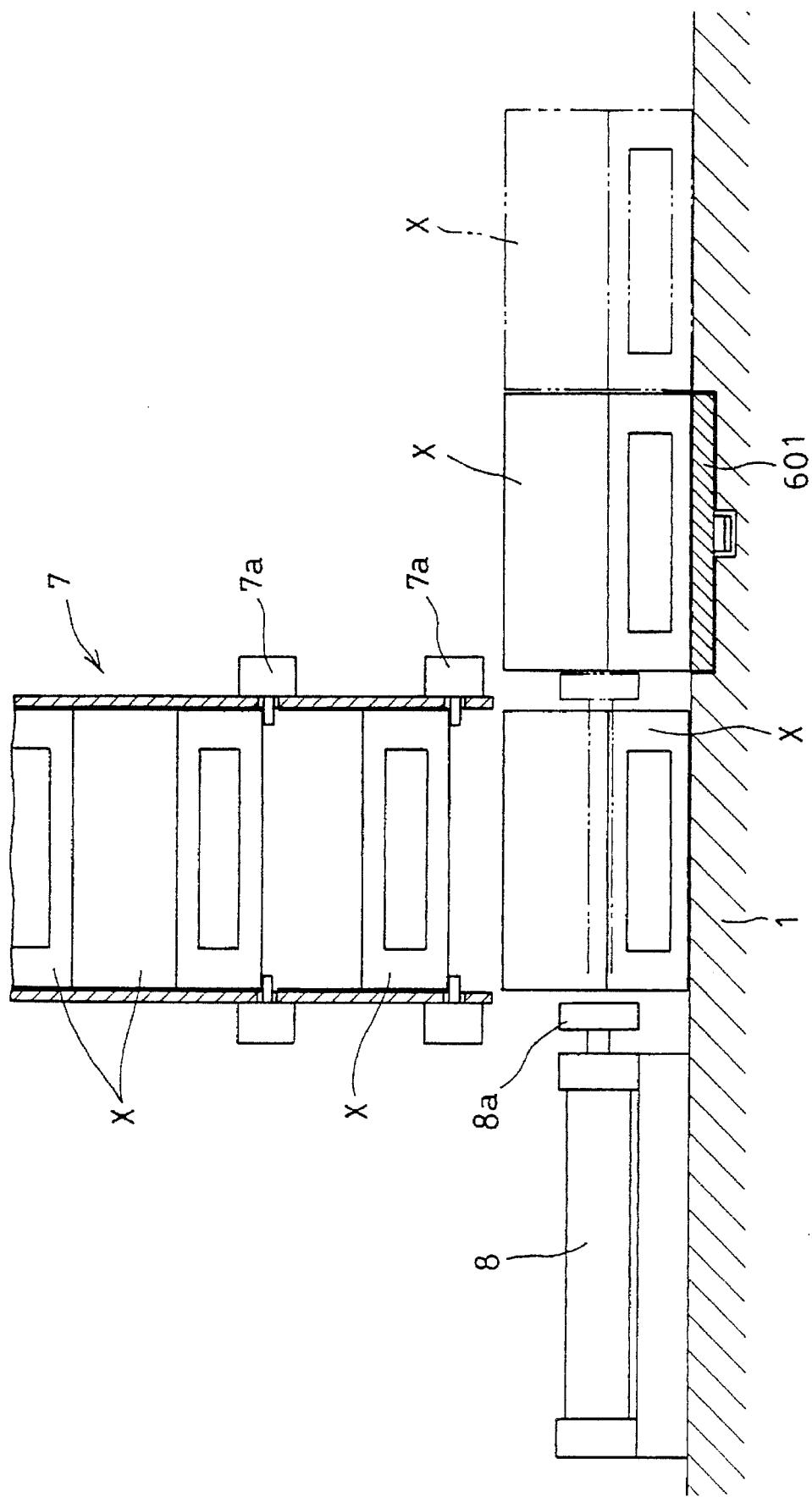

METHOD AND APPARATUS FOR PRINTING FILMS

BACKGROUND OF THE INVENTION

This invention relates to a method and apparatus for printing films housed in cartridges.

One known photographic printing apparatus for printing color images on films onto photosensitive material has a scanner unit, a printing/exposure means and a film carrier. The scanner unit optically reads printing conditions such as image densities from films. According to the data on printing conditions, the density of light from a light source is adjusted with a light adjustment filter for one of the three primary colors of light, that is, red, green and blue. The adjusted light is projected on a film to print its images onto a photosensitive material.

Light from another light source than the one for the printing/exposure means is projected on the scanner unit to allow an optical sensor to read the image information of the film. The image information is used to determine printing conditions, which are sent to the printing/exposure means in the form of electric signals.

After reading the image information, the film is sent to the printing/exposure means by the film carrier and printed. Printing conditions are determined for each frame of a film using an average value of the image densities in all the frames of the film as a reference.

In one conventional arrangement, films are manually inserted one by one into the printing apparatus. In another arrangement, a plurality of films are spliced together at their ends and wound on a reel. The spliced films are automatically fed into the printing apparatus through the film supply unit.

The image information of the films inserted in the printing apparatus is read by the scanner unit provided along the feed path in the film carrier. Films are then printed under conditions determined based on the image information. Generally speaking, the time needed for reading the image density and determining the printing conditions is shorter than the time for printing.

Because of such differences in processing time, while one film is being printed, the subsequent film is kept in a stand-by position without reading its image density. After the printing of the first film has finished, while the image density of the subsequent film is being read, no printing is done.

In such an arrangement, it is impossible to process a plurality of films with high efficiency. One possible solution to this problem is to drive the scanner unit and the printing/exposure means independently of each other and to further provide a loop portion therebetween to adjust the feed of films.

By feeding a plurality of films spliced together and wound on a reel into such a printing apparatus, it is possible to improve the processing speed and efficiency considerably.

One problem of this arrangement is that only one reel for supplying film can be attached to the printing apparatus at a time. Namely, it is impossible to process a plurality of films wound on one plurality of reels at a time. Thus, the film processing speed is limited. In this regard, this arrangement has still room for improvement.

SUMMARY OF THE INVENTION

It is an object of the invention to provide a method and apparatus for printing films in which a plurality of films, each accommodated in a separate cartridge, can be processed concurrently in a scanner unit and a printing/exposure unit without the need for separating the films from cartridges or splicing them together.

As a means to attain this object, this invention provides a method of printing photographic films comprising the steps of moving a plurality of cartridges, each accommodating a film, along a circular path of a predetermined radius, and pulling the film out of one cartridge toward a scanner unit provided outside of the circular path and along a diametrical line that passes the center of the circular path. Further, the method has the steps of reading image data of the film with the scanner unit, setting printing conditions based on the image data, rewinding the film back into the one cartridge, and moving the cartridge along the circular path to another processing position. The film is pulled out of the cartridge toward a printing/exposure means provided outside of the circular path and along a diametrical line that passes the center of the circular path. Each frame of the film is then printed and exposed according to the printing conditions. The steps are carried out concurrently for a plurality of cartridges by the scanner unit and the printing/exposure means provided independently of each other.

As a device for carrying out this method, there is provided a photographic printing apparatus comprising a base, a rotary table rotatably mounted on the base, a plurality of cartridge holders mounted on the rotary table along the circumference thereof at regular angular distances, and a cartridge supply means, a scanner unit and a printing/exposure means, all of which are mounted on the base around the rotary Table. The cartridge supply means and the scanner unit are positioned so that when the rotary table is in a predetermined position, one of the cartridge holders faces one of the cartridge supply means and the scanner unit, whereas another cartridge holder faces the other. The scanner unit and the printing/exposure means are positioned relative to each other so that when the rotary table is turned by a predetermined angle from the predetermined position, the one of the cartridge holders moves from the scanner unit to the printing/exposure means. The scanner unit and the printing/exposure means are provided separately from and driven independently of each other, whereby the film in a plurality of cartridges accommodated in the plurality of cartridge holders can be processed concurrently.

In this arrangement, the scanner unit and the printing/exposure means may be positioned so as to be opposed at opposite ends of a diametrical line of the rotary table.

Otherwise, the center-to-center distance between the scanner unit and the printing/exposure means may be substantially equal to the center-to-center distance between them in a non-rotary type photographic printing apparatus. Thus the rotary table may be detachable from the base, whereby the rotary table can be replaced with a carrier unit in a non-rotary type printing apparatus.

In either case, each cartridge holder preferably has a means for automatically opening and closing a light shield lid of a cartridge, and driving means for feeding a film out of the cartridge and rewinding the film into the cartridge.

Such a photographic printing apparatus may further comprise a stocker provided near the cartridge supply means for stocking a plurality of cartridges and automatically feeding them one by one.

Also, such a printing apparatus may further comprise bar code detectors each mounted on a top plate of each cartridge holder for reading a cartridge number indicated on each cartridge in the form of a bar code. A printing means prints the cartridge number thus read on the back side of a photosensitive material when printing the film images on the photosensitive material.

According to the present invention, a plurality of films each housed in a separate cartridge are fed along a circular path. While they are being fed, the scanner unit provided along the circular path reads necessary data of the films such as image densities. When each film proceeds to the printing/exposure unit provided also along the circular path, it is printed under printing conditions determined by use of the data obtained in the scanner unit. Since the scanner unit and the printing/exposure unit are operated independently of each other, a plurality of films housed separately in a plurality of cartridges can be processed at the same time. Thus, printing can be done with high efficiency.

BRIEF DESCRIPTION OF THE DRAWING

Other features and objects of the present invention will become apparent from the following description made with reference to the accompanying drawings, in which:

FIG. 7 is a sectional view of a stocker; and

FIG. 8 is a sectional view of a stocker of a different type.

DETAILED DESCRIPTION OF THE PREFERRED EMBODIMENT

Now description will be made of an embodiment of the invention with reference to the drawings.

Figure 1:
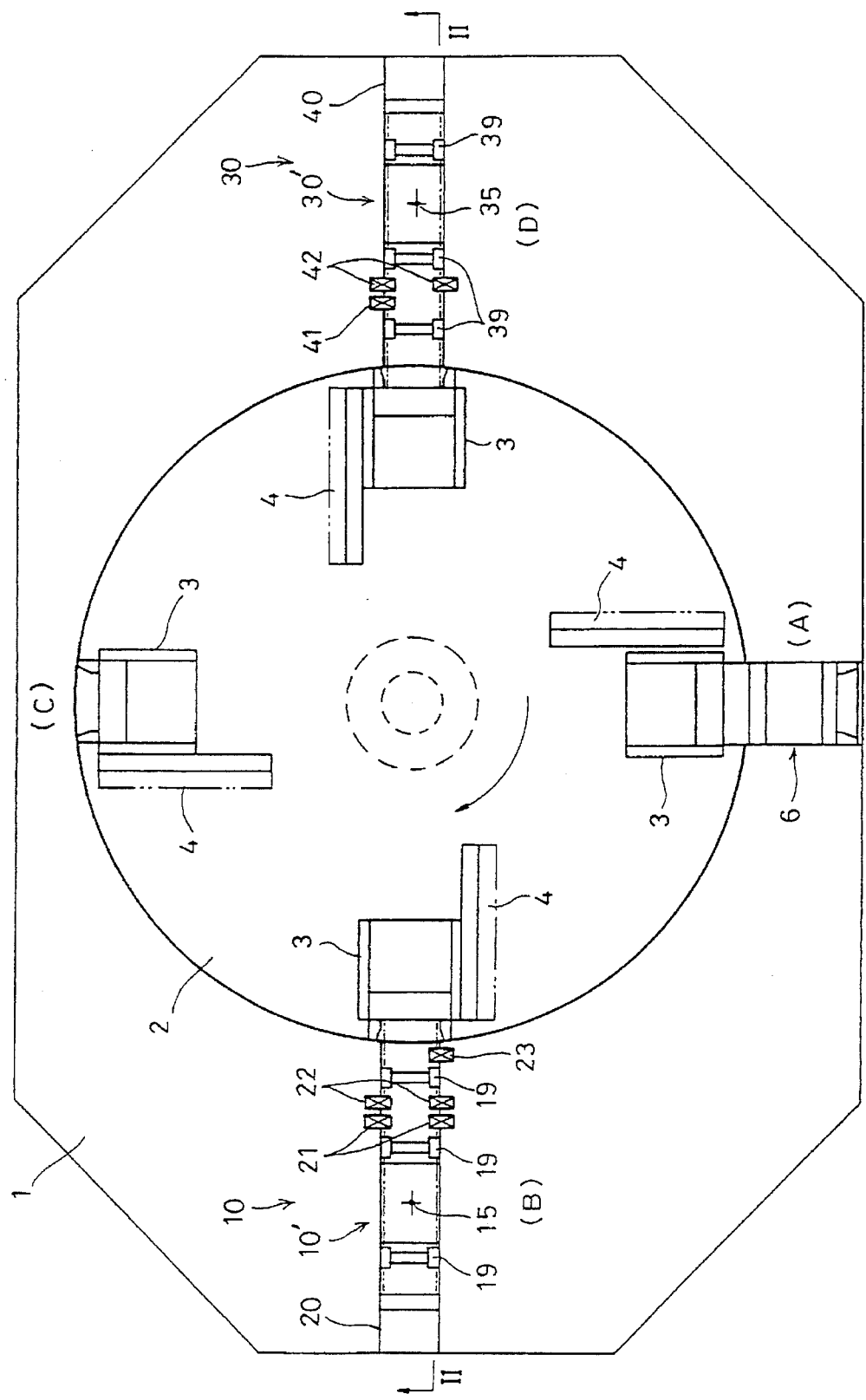
FIG. 1 is a plan view of a photographic printing apparatus of one embodiment.
Figure 2:
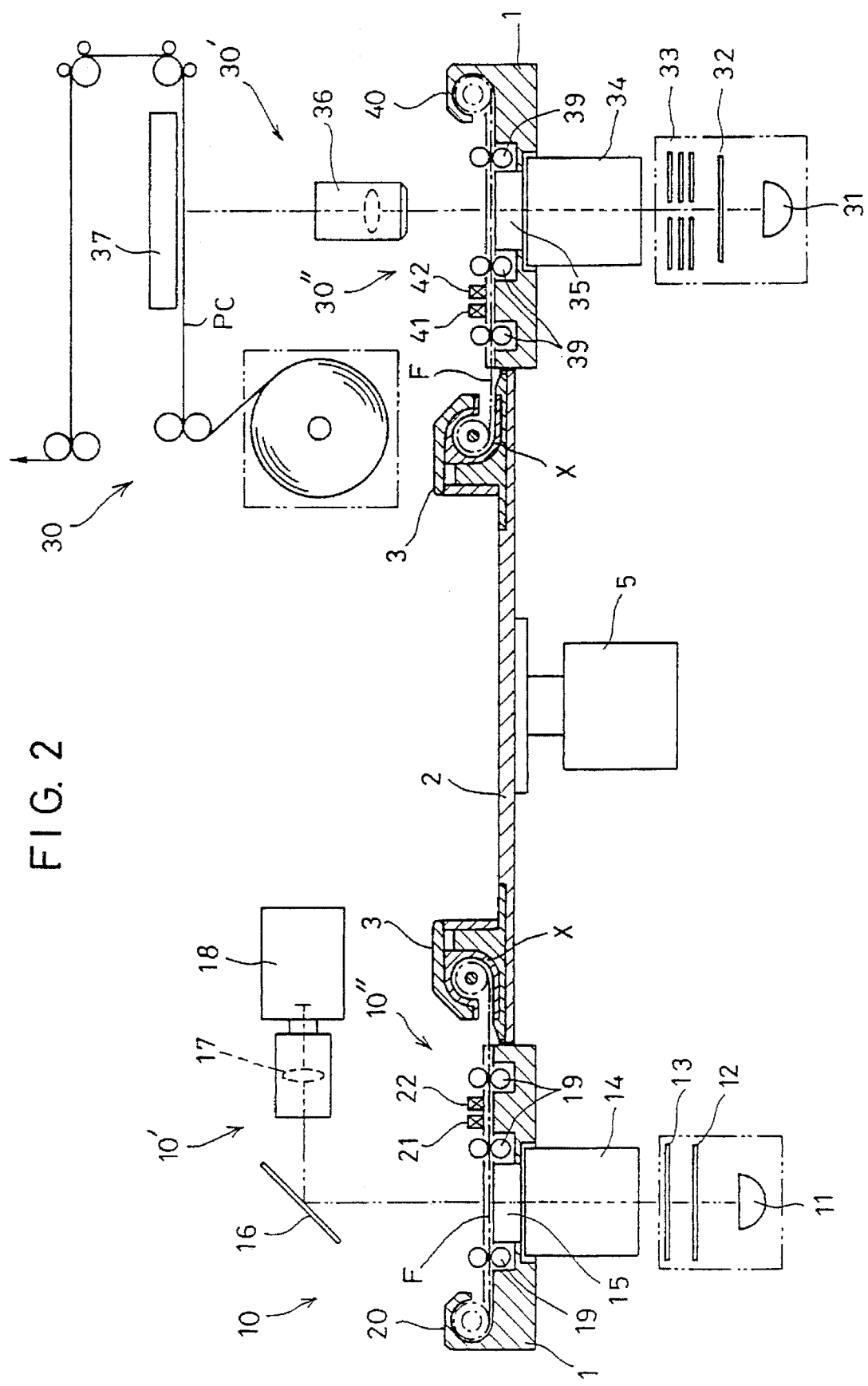
FIG. 2 is a sectional view taken along line II—II of FIG. 1.

FIG. 1 is a plan view of a photographic printing apparatus of the embodiment. FIG. 2 is a sectional view taken along line II—II of FIG. 1.

As shown in FIG. 1, the photographic printing apparatus includes a base 1 on which are mounted various parts of the apparatus. A rotary table 2 is rotatably mounted at the center of the base 1. Four cartridge holders 3 are mounted on the rotary table 2 along its circumference and along two diameters that intersect each other at a right angle. The cartridge holders 3 are driven by individual driving units 4, which we will describe in detail later. Numeral 5 in FIG. 2 is a driving unit for driving the rotary table 2.

Numeral 6 indicates a cartridge supply unit provided on the base 1. A cartridge accommodating a film is fed into one of the cartridge holders 3 while the cartridge holder 3 is resting at a position opposite the unit 6, or otherwise a processed cartridge is ejected from this holder.

A scanner assembly 10 is provided outside the rotary table 2 along a line that passes the center of the rotary table 2 and the cartridge holder 3 that is angularly displaced by 90° in the direction of arrow of FIG. 1 from the cartridge holder 3 located opposite the cartridge supply unit 6.

As shown in FIG. 2, the scanner assembly 10 comprises a scanner unit 10' and a film unwinding unit 10". The former is a conventional one. Light from a light source 11 is projected on a film F through a filter 12, a shutter 13, a mirror tunnel 14 and an opening 15 formed in the base 1. The light passing through the film is then reflected by a reflecting mirror 16, passes through a lens 17 and is received by a scanner 18.

The film unwinding unit 10" comprises a plurality of pairs of feed rollers 19 and a film winder 20. The film F in the cartridge X set in each cartridge holder 3 is fed by the rollers 19 toward the winder 20 and temporarily wound therearound. When all the images on the film F are read by the scanner unit 10', the film is rewound back into the cartridge X in the cartridge holder 3. Numeral 21 indicates a bar code detector, 22 a magnetic head, and 23 a perforation detector.

Provided across the rotary table 2 from the scanner assembly 10 is a printing/exposure means 30, which comprises a printing/exposure unit 30' and a film unwinding unit 30".

The printing/exposure unit 30' is a conventional one. Light from its light source 31 passes through a heat absorbing filter 32, a light adjusting filter 33, a mirror tunnel 34 and an opening 35 for printing formed in the base 1, and is projected onto the film F. The light passing through the film F proceeds through a lens 36 and is projected on a photosensitive material PC supported on a paper mask 37 to print the film images onto the photosensitive material.

The film unwinding unit 30" is basically of the same structure as the film unwinding unit 10" of the scanner assembly 10. Namely, it comprises feed roller pairs 39 and a winder 40. Numeral 41 designates a perforation detector, and 42 does a magnetic head.

The scanner assembly 10 and the printing/exposure means 30 are independently provided and driven.

The center-to-center distance between the scanner assembly 10 and the printing/exposure means 30 may be set equal to the distance between the scanner assembly and printing/exposure means of a conventional photographic printing apparatus of the type in which films are fed longitudinally with a film carrier. With this arrangement, the printing apparatus of this embodiment can be easily converted into the conventional type simply by removing the base 1 including the rotary table 2. Of course, the conversion in the other way around is also possible.

FIGS. 3-6 show the details of the cartridge holder 3, its driving unit 4 and the cartridge supply unit 6. The cartridge holder 3 is a box-shaped member comprising side walls 301 and a pivotable top plate 302. The top plate 302 is pivoted to open and closed positions by a small motor 303 in this embodiment. But it may be pivoted by any other unit. Numeral 304 indicates a bar code detector.

The driving unit 4 is movable toward and away from the cartridge holder 3. For example, its casing 400 may be moved by an air cylinder 401 along a guide 402. The turning torque of a motor 403 is transmitted through a belt 404 to a rotary shaft 405. The driving force of a solenoid 406 is transmitted through a link bar 407 to a rotary shaft 408. The rotary shafts 405 and 408 are positioned such that when the driving unit 4 is connected to the cartridge holder 3, their free ends will protrude through the side wall 301 into the holder and engage in holes of the cartridge housed in the holder.

Figure 5:
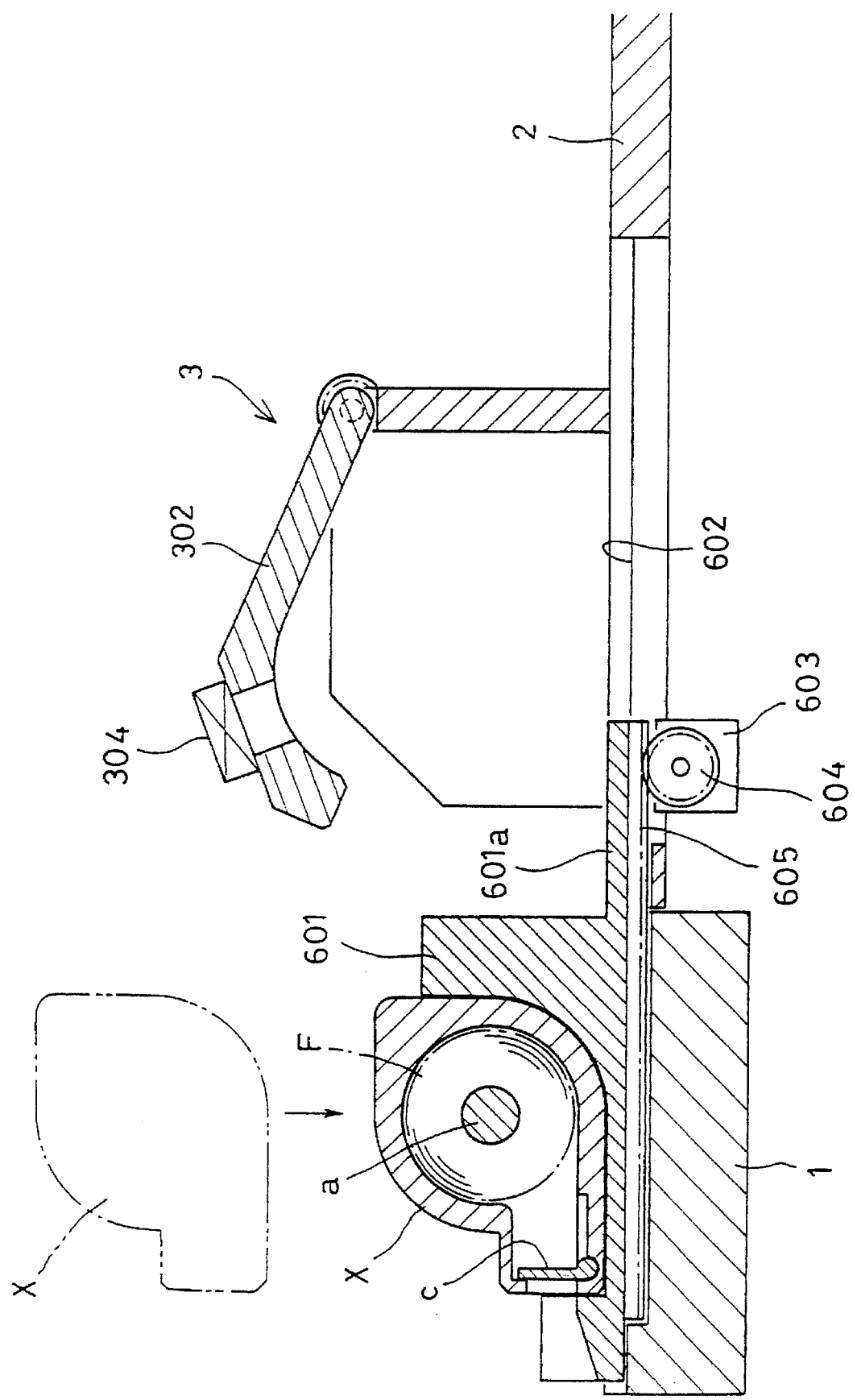
FIG. 5 is a sectional view of the same taken along line V—V of FIG. 4.
Figure 6:
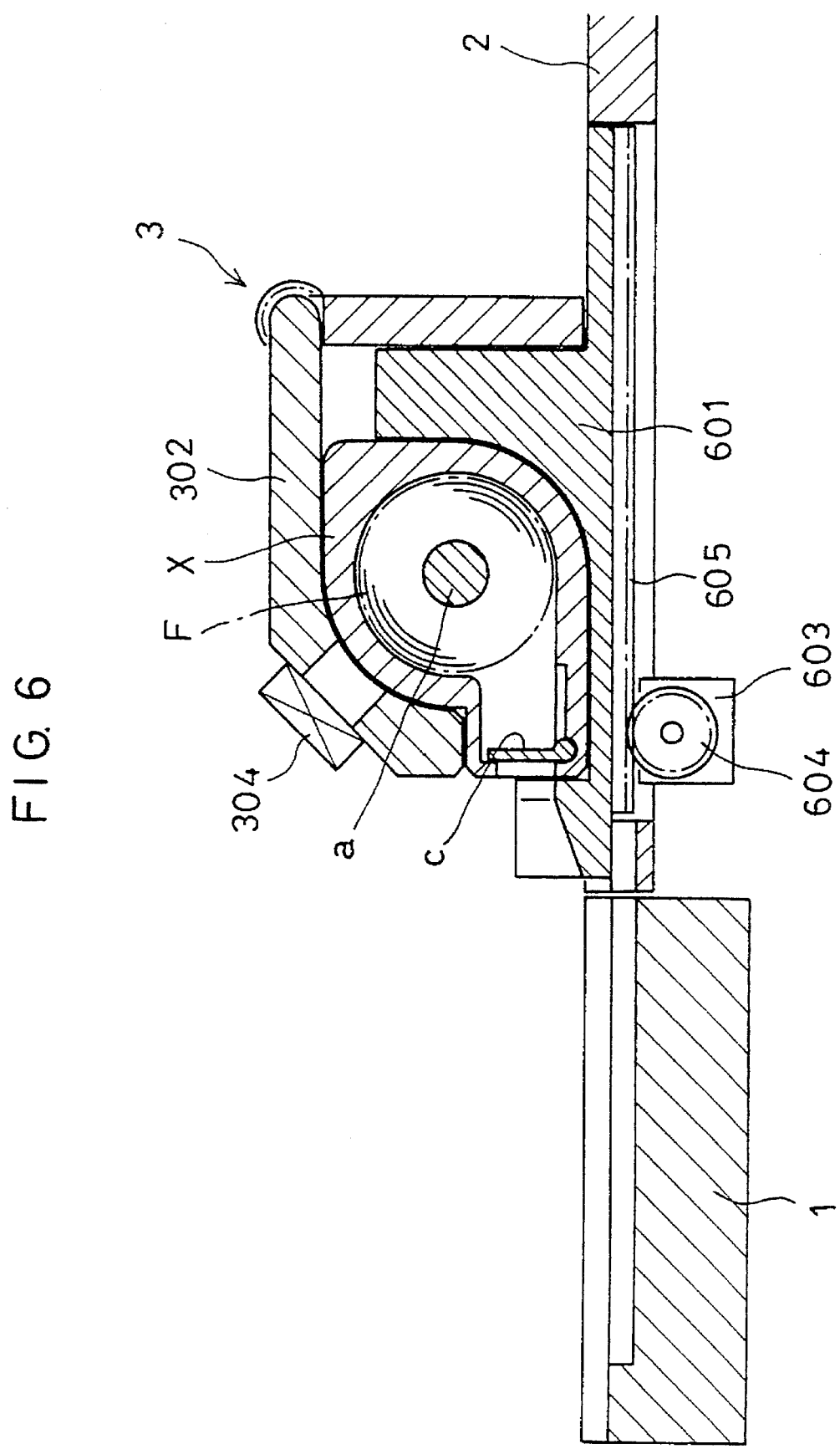
FIG. 6 is a sectional view of the same, showing the operation of the cartridge holder and cartridge supply unit.

The cartridge supply unit 6 has a pillow-shaped slide 601 slidably received in a radial groove 602 formed in the rotary table 2 to support the cartridge X. As shown in FIG. 5, mounted under an apron 601a of the slide 601 is a driving unit for feeding the cartridge X into the cartridge holder 3. It comprises a motor 603, a pinion 604 driven by the motor 603, and a rack 605 in mesh with the pinion 604.

The cartridge X illustrated has the shape of a snail shell, but it may be of any other shape. In the illustrated example, the cartridge X has a core a around which a film is to be wound, a light shield lid c, and a shaft b for opening the light shield lid. Holes a' and b' are formed in the core a and shaft b near their ends. A bar code d is printed on the outer surface of the cartridge X.

We will now describe the operation of the photographic printing apparatus of this embodiment.

When one of the cartridge holders 3 stops at position (A), that is, the position opposite the cartridge supply unit 6, the driving unit 4 is moved away from the holder 3, the top plate 302 is opened, and the slide 601, which has been accommodated in the cartridge holder 3, is pushed out toward the cartridge supply unit 6 by the motor 603.

If there is a cartridge X whose film has already been printed, the cartridge is removed from the slide 601. Then, a new cartridge X is set on the slide 601. Though not shown in the figures, a cartridge in the holder may be automatically ejected with a cylinder having a pushrod. This cylinder is necessary if a cartridge stocker, which we will describe later, is used.

When the necessary film processing steps in the other three positions have finished, the cartridge X is fed into the cartridge holder 3 together with the slide 601. The top plate 302 is then closed to fix the cartridge X in position, and the driving unit 4 is moved into abutment with the cartridge holder 3. In this state, the rotary table 2 is turned 90° to bring the cartridge X to the scanner assembly 10 (position B). After closing the top plate 302, the cartridge number indicated by the bar code d on the cartridge X is read by the bar code detector 304.

At the scanner assembly 10, the film F is pulled out of the cartridge X to read out the image density and magnetic data of the film F. In this state, the end of the rotary shaft 408 of the driving unit 4 is engaged in the hole b' of the shaft b. Thus, the light shield lid c of the cartridge X can be opened by turning the rotary shaft 408 by activating the solenoid 406.

After opening the lid, the motor 403 is started to feed the film F by turning the core a through the belt 404 and rotary shaft 405. The film F is fed by the feed rollers 19 and wound onto the winder 20. While the film is being fed, the image position is detected by the perforation detector 23, the magnetic data of the film are detected by the magnetic head 22, and the latent image bar code is detected by the bar code detector 21.

Each frame of the film, whose position is detected by the perforation detector 23, is stopped momentarily over the scanner opening 15 to measure the image density. Since the manner of measuring the image density in the scanner assembly is conventional, its description is omitted.

After reading the image densities in all the frames of the film, the feed rollers 19, driving motor 403 and winder 20 are turned in reverse to rewind the film into the cartridge X. The rotary table 2 is then turned another 90° to move the cartridge X to a calculation/communication position (C).

In position (C), printing conditions are calculated and determined for each frame of the film based on the image density data, magnetic data and bar code data obtained. Determination of printing conditions may be made by stopping each cartridge at position (C) or while it is moving past position (C). After determining the printing conditions, the rotary table 2 is turned a further 90° to a printing/magnetic data input position (D), and at the same time, the printing conditions determined are transferred to the printing/exposure means 30.

At printing/magnetic data input position (D), the film end is pulled out of the cartridge by the rotary shaft a in a similar manner as in the scanner assembly 10. The film is further pulled out by the feed rollers 39 into the film guide. The perforation detector 41 detects the image position of the film being fed, while the data on printing conditions are inputted by the magnetic head 42.

The film is stopped every time each image of the film, whose position has been detected by the perforation detector 41, comes to a position right over the opening 35 to print the image onto the photosensitive material PC. At the same time, the cartridge number (bar code) on the surface of the cartridge is read by the bar code detector 304 provided on the top plate 302 and printed on the back of the photosensitive material PC. This operation is repeated for the image in each frame of the film. The portion of the film that has been printed is temporarily wound onto the winder 40.

When all the images of the film have been printed, the feed rollers 39, motor 403 and winder 40 are turned in reverse to rewind the film F back into the cartridge X. The light shield lid c is then closed.

The rotary table 2 is turned by 90° again to carry the cartridge X to position (A) where the cartridge is ejected and a new cartridge is set.

The above-mentioned steps in the respective four positions are carried out not one after another, but at the same time. In other words, with this arrangement, it is possible to process four cartridges X housed in four cartridge holders 3 at the same time at four different positions. More specifically, since the scanner assembly 10 and the printing/exposure means 30 are provided separately from and driven independently of each other, it is possible to determine and transfer printing conditions for the film F housed in one cartridge X, and at the same time to detect the image density and magnetic data of the film F in another cartridge X, while printing the film F in still another cartridge X.

Also, only the image density may be detected in the scanner assembly 10, whereas the magnetic data may be read by an additional magnetic head 22 provided on the base 1 at position (C).

In the embodiment, cartridges X are manually set one by one onto the cartridge supply unit 6. But they may be set automatically using a stocker in the manner described below with reference to FIGS. 3, 7 and 8.

Figure 3:
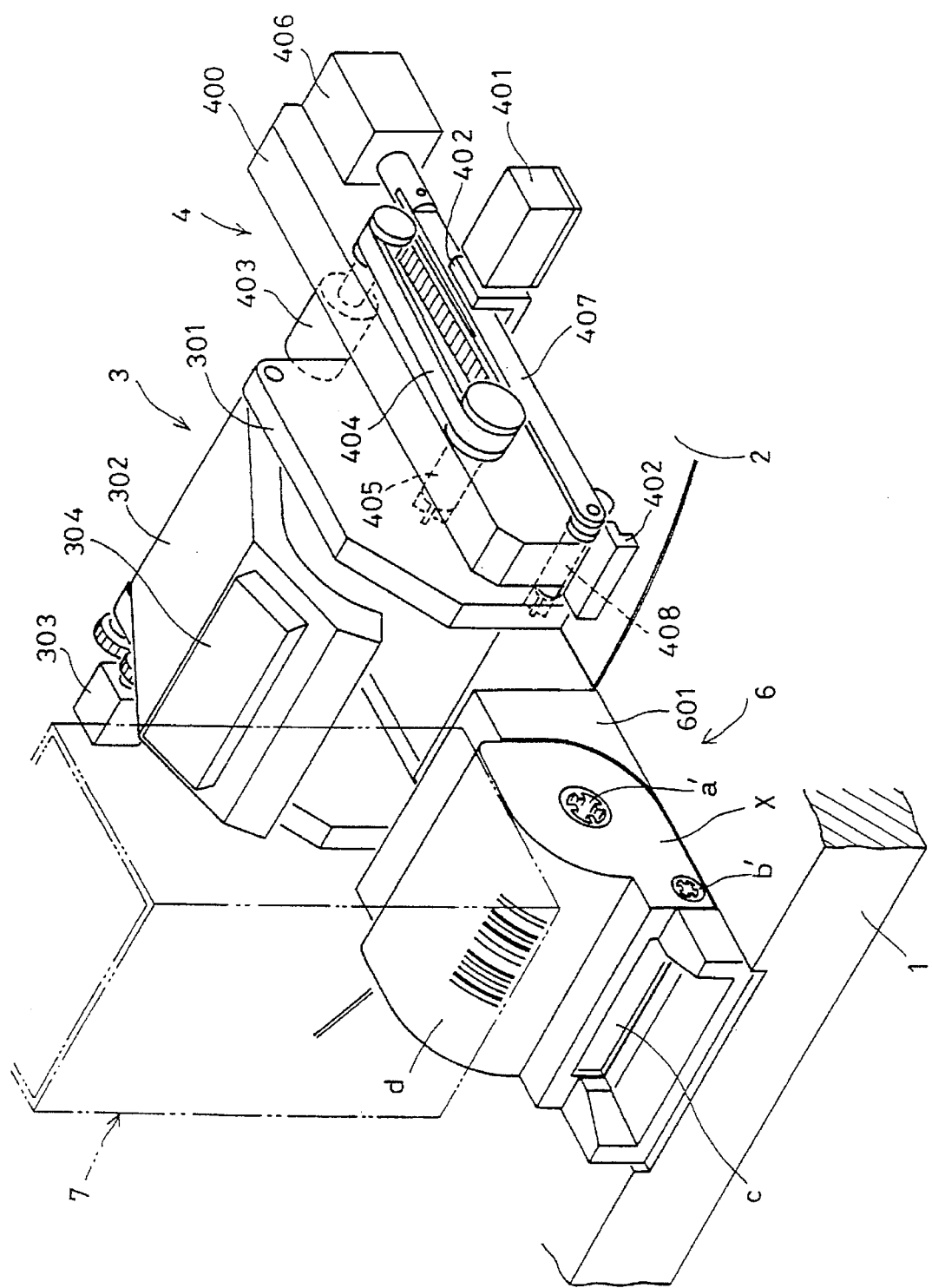
FIG. 3 is a perspective view of a cartridge holder and a cartridge supply unit.
Figure 4:
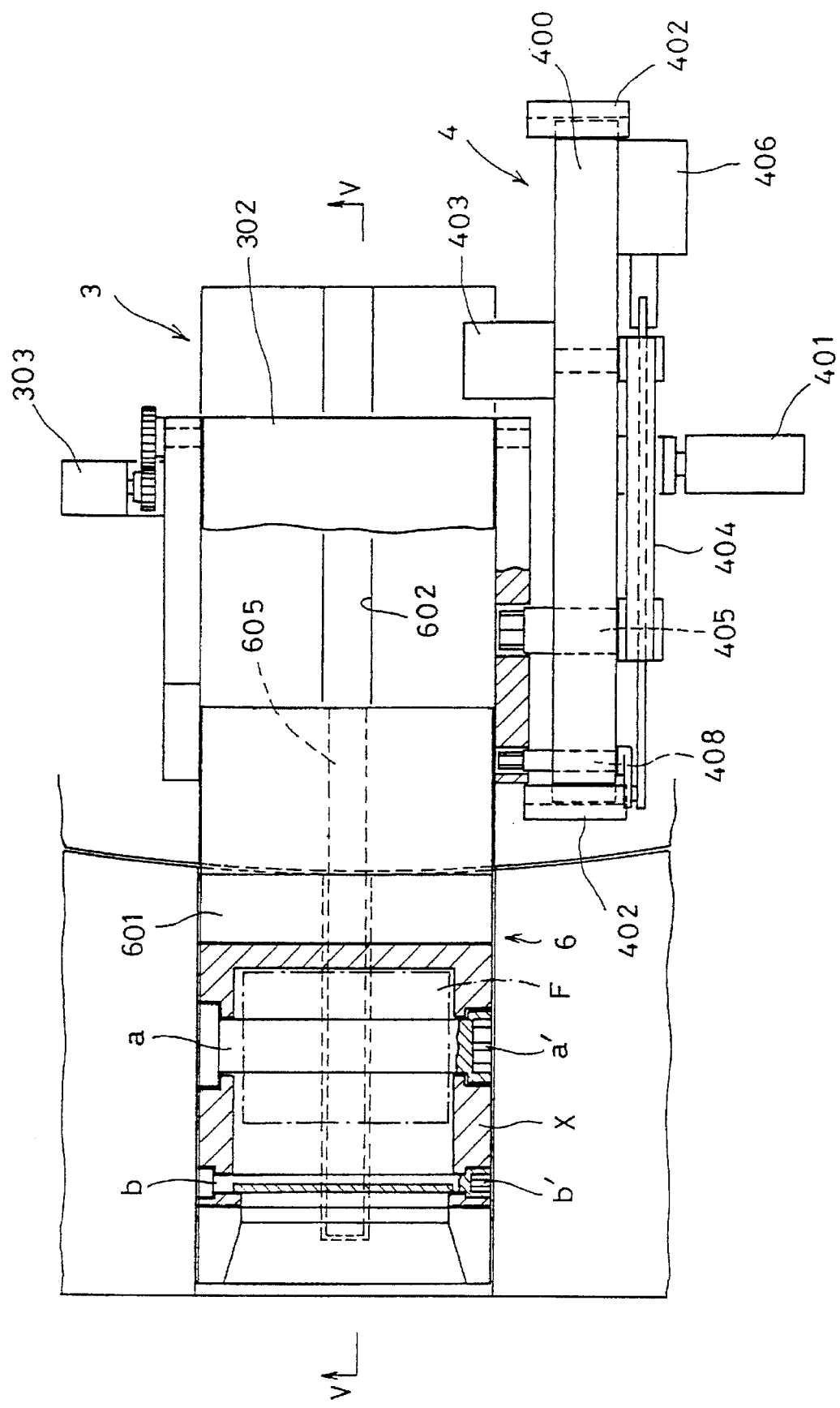
FIG. 4 is a plan view of the same.

A dashed line in FIG. 3 indicates the outline of the stocker. FIG. 7 shows its section. In this embodiment, a stocker 7 is provided right over the cartridge supply unit 6. A plurality of cartridges X are stacked one on another in the stocker 7. Solenoids 7a having pins for supporting cartridges X are mounted on both sides of the stocker at two different levels. By retracting the pins of the lower solenoids 7a, while keeping the cartridges other than the lowermost cartridges supported on the pins of the upper solenoids 7a, it is possible to drop only the lowermost cartridge X onto the cartridge supply unit 6.

A cylinder 8 having a pushrod 8a is provided at the side of the cartridge supply unit 6. The pushrod 8a is adapted to automatically eject cartridges X when they have been processed in the printing apparatus and returned to the supply unit 6. The cartridge X represented by solid line is pushed out by the pushrod 8a to the position shown by a two-dot chain line.

FIG. 8 shows a modified embodiment, which is the same in the structures of the stocker 7 and the cylinder 8 having the pushrod 8a, but differs in that the stocker 7 is provided not right over the cartridge supply unit 6, but offset sideways therefrom. Thus, in this embodiment, each cartridge X is dropped onto the base 1 beside the cartridge supply unit 6 first and then pushed into the cartridge supply unit 6 by the pushrod 8. When ejecting a cartridge, it is pushed farther ahead.

In the above embodiment, cartridge holders 3 are moved along the circumferential path of the rotary table 2. But they may be moved along a circular path provided on the base 1.

Also, it is possible to modify the method and mechanism for feeding films in different ways within the scope of the present invention.

What is claimed is:

1. A method of printing photographic films, comprising the steps of:
   a) supporting a plurality of film cartridges along the circumference of a rotary table;
   b) moving the cartridges along a circular path having a fixed radius;
   c) pulling film out of one of the film cartridges at a first processing position toward a scanner unit fixed outside of the circular path and along a diametrical line of the circular path, the scanner unit having a first film winding unit fixedly mounted thereto;
   d) reading image data of the film with the scanner unit while winding the film with the first winding unit;
   e) establishing printing conditions based upon the image data read in said step of reading;
   f) rewinding the film back into the one of the film cartridges;
   g) moving the one of the film cartridges along the circular path to another processing position;
   h) pulling the film out of the one of the film cartridges toward a printing and exposure unit fixed outside of the circular path along a diametrical line of the circular path, the printing and exposure unit having a second film winding unit fixedly mounted thereto;
   i) exposing and printing each frame of the film in accordance with the printing conditions established in said step of establishing while winding the film with the second film winding unit;
   j) rewinding the film back into the one of the film cartridges; and
   k) carrying out said steps c–f for a second one of the film cartridges substantially concurrently with said steps h–j for the first one of the film cartridges, the scanner unit and the printing and exposure unit being provided independently of each other.

2. A photographic printing apparatus, comprising:
   a base;
   a rotary table mounted on said base;
   a plurality of cartridge holders mounted on said rotary table along the circumference of said rotary table at a regular angular spacing;
   a cartridge supply unit, a scanner unit and a printing and exposure unit mounted on said base around said rotary table,
   wherein said cartridge supply unit and said scanner are positioned so that when said rotary table is in a certain position one of said cartridge holders faces one of said cartridge supply unit and said scanner, and another of said cartridge holders faces the other of said cartridge supply unit and said scanner unit;
   wherein said scanner unit and said printing and exposure unit are positioned relative to each other so that when said rotary table is turned by a set angular amount from the certain position the one of said cartridge holders moves from said scanner unit to a position facing said printing and exposure unit;
   wherein said scanner unit and said printing and exposure unit comprise first and second winding units fixedly mounted thereto, respectively, for winding a film pulled out of a film cartridge toward one of said scanner unit and said printing and exposure unit when supported by one of said plurality of cartridge holders and located facing the one of said scanner and said printing and exposure unit; and
   wherein said scanner unit and said printing and exposure unit are disposed and driven separately and independently of each other, whereby when film cartridges are in said plurality of cartridge holders, the film in a plurality of the film cartridges can be processed by said scanner unit and said printing exposure unit concurrently.

3. The apparatus of claim 2, wherein said scanner unit and said printing and exposure unit are at opposite ends of a diameter of said rotary table.

4. The apparatus of claim 2, wherein said scanner unit and said exposure unit have a center-to-center distance there between substantially equal to the center-to-center distance between a scanner unit and a printing and exposure unit in a non-rotary type photographic printing apparatus having a carrier unit, said rotary table is detachable from said base, and said rotary table is replaceable with the carrier unit of the non-rotary type printing apparatus.

5. The apparatus of claim 2, wherein each of said cartridge holders comprises a means for automatically opening and closing a light shield lid of a film cartridge and a driving means for feeding film out of a film cartridge and rewinding the film into the film cartridge.

6. The apparatus of claim 2, and further comprising a stocker located adjacent to said cartridge supply unit for stocking a plurality of film cartridges and automatically feeding the plurality of film cartridges one by one to said cartridge supply unit.

7. The apparatus of claim 2, and further comprising bar code detectors mounted on a top plate of each of said plurality of cartridges holders for reading a cartridge number indicated on each film cartridge in the form of a bar code and a printing means for printing the cartridge number read by a said bar code detector on the back side of photosensitive material on which images of the film of the corresponding film cartridge are printed when the images are printed.

8. A photographic printing apparatus, comprising:
   a base;
   a rotary table mounted on said base;
   a plurality of cartridge holders mounted on said rotary table along the circumference of said rotary table at a regular angular spacing;
   a cartridge supply unit, a scanner unit and a printing and exposure unit mounted on said base around said rotary table at an angular spacing such that when one of said cartridge holders faces one of said scanner unit and said printing and exposure unit, another one of said cartridge holders faces the other of said scanner unit and said printing and exposure unit; and
   first and second film winding units fixed with respect to said scanner unit and said printing and exposure unit, respectively, for winding a film pulled out of a film cartridge toward said scanner unit and said printing and exposure unit, respectively, when supported by one of said plurality of cartridge holders and located facing said scanner unit and said printing and exposure unit, respectively, whereby film in different film cartridges can be processed by said scanner unit and said printing and exposure unit at the same time.

9. The apparatus of claim 8, wherein said first and second film winding units are disposed along a diameter of said rotary table outside the circumference thereof.

10. The apparatus of claim 9, wherein when said plurality of cartridge holders face said scanner unit and said printing and exposure unit, said first and second film winding units are interposed between said plurality of cartridge holders and said scanner unit and said printing and exposure unit, respectively.

11. The apparatus of claim 10, wherein each of said plurality of cartridge holders comprises an individual driving unit for feeding film from a film cartridge holder to one of said first and second film winding units.

* * * * *